Aug. 16, 1927.
E. M. KNABUSCH ET AL
1,639,039
SAW GUIDE
Filed Oct. 10, 1925  5 Sheets-Sheet 1
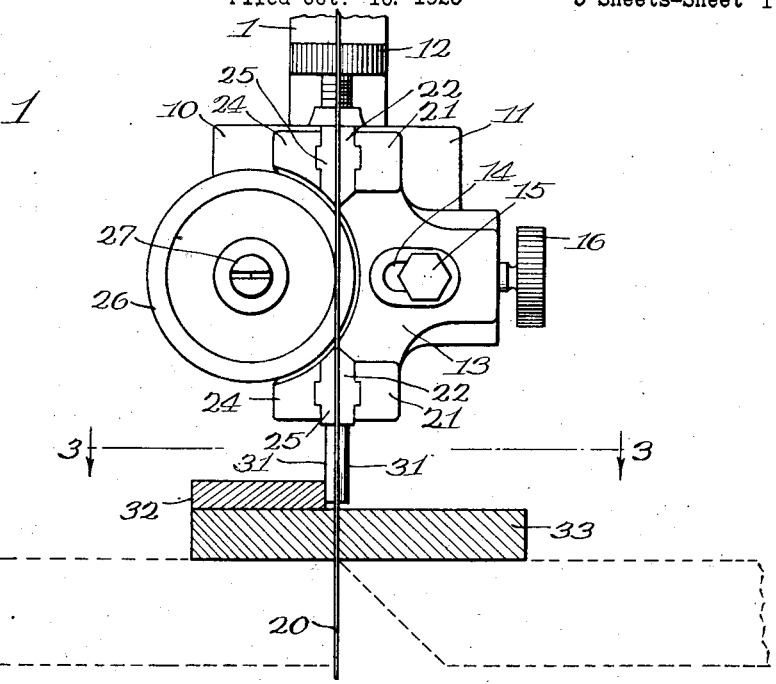
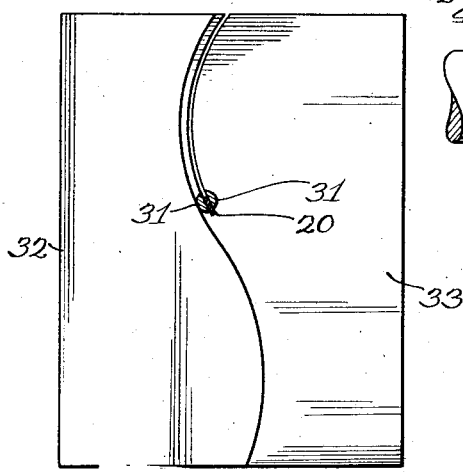
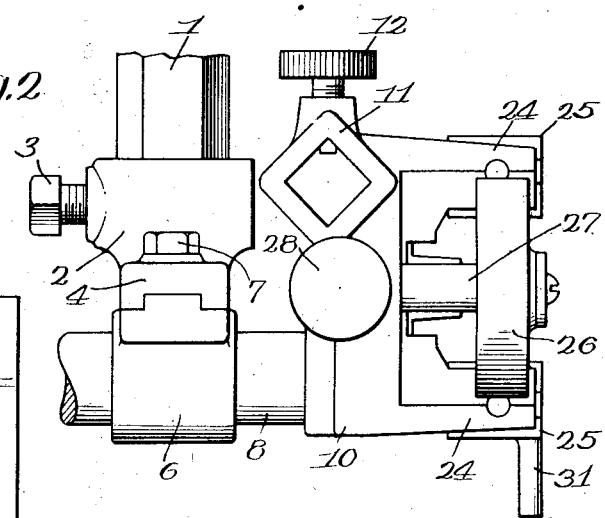
Inventors:
Edward M. Knabusch
Edwin Shoemaker
By Arthur F. Durand
Atty.

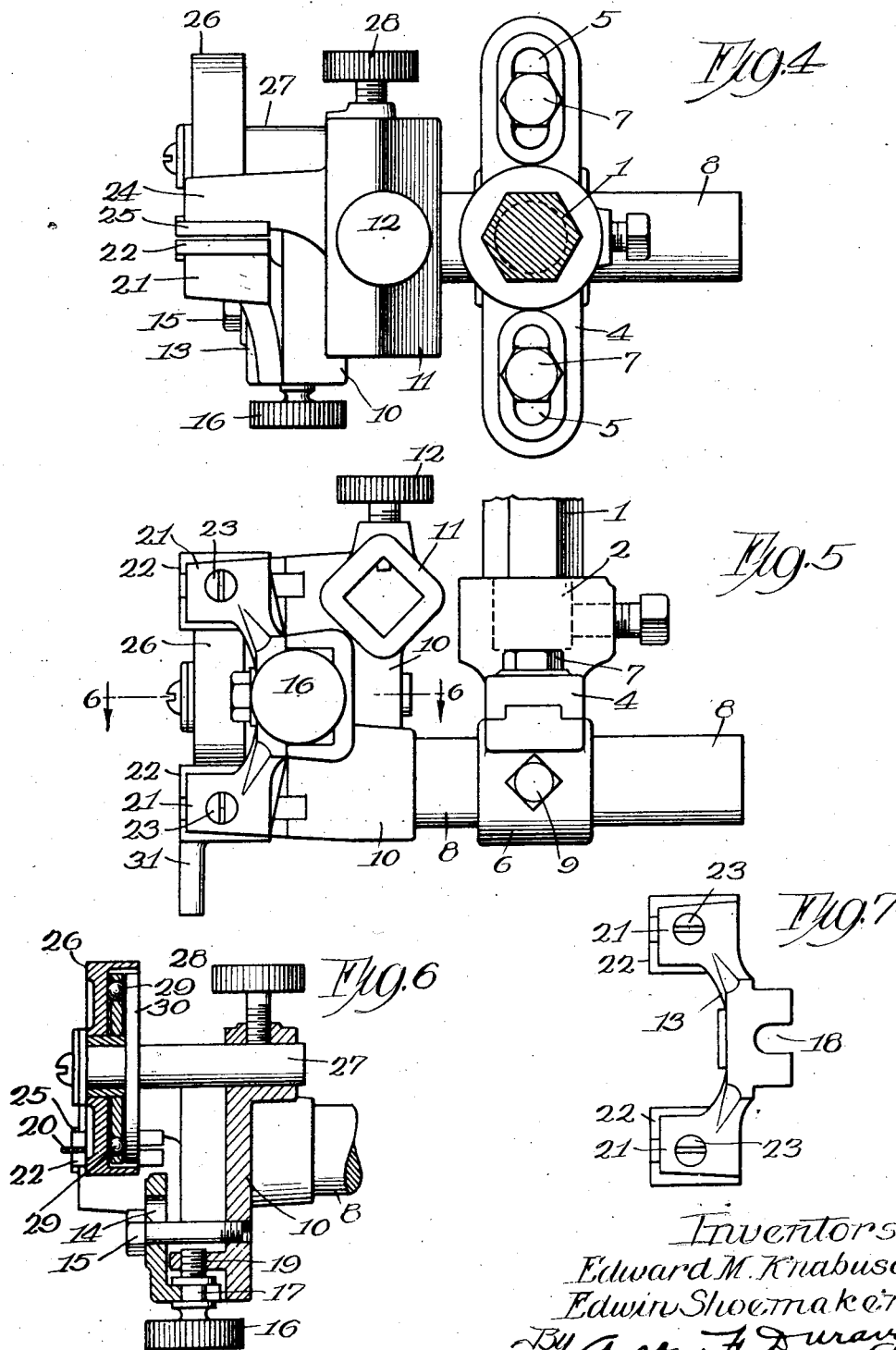

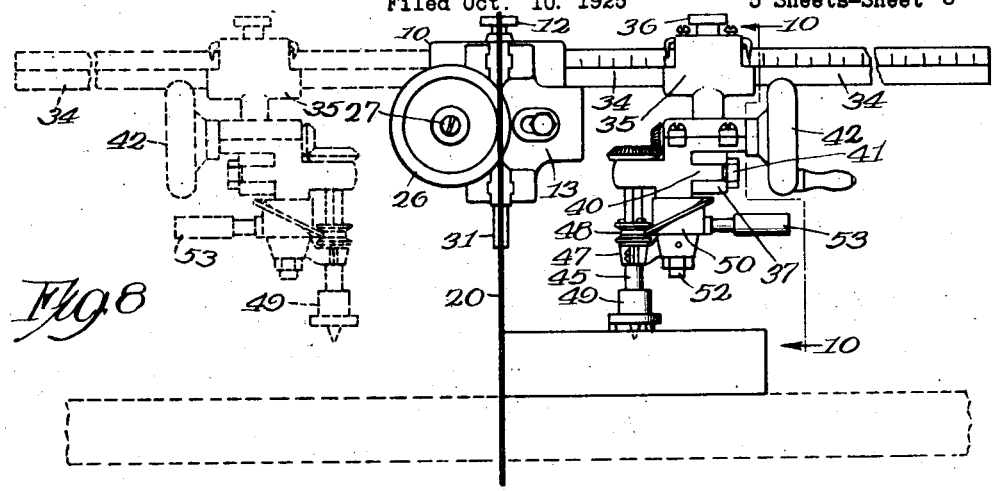

Aug. 16, 1927. 1,639,039
E. M. KNABUSCH ET AL
SAW GUIDE
Filed Oct. 10. 1925 5 Sheets-Sheet 4
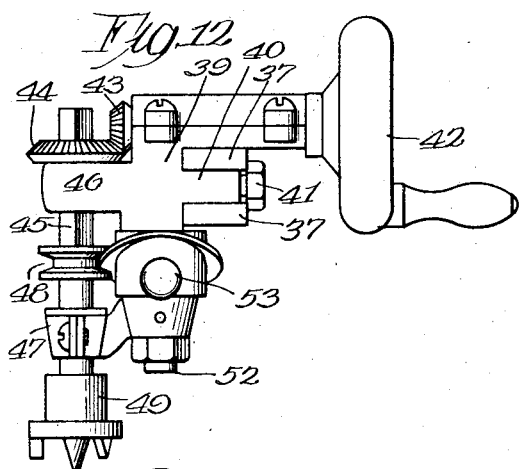
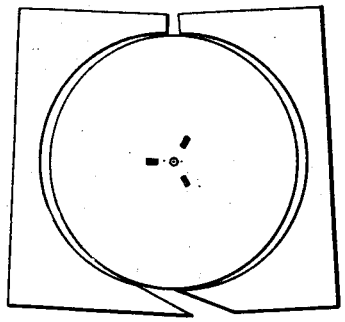
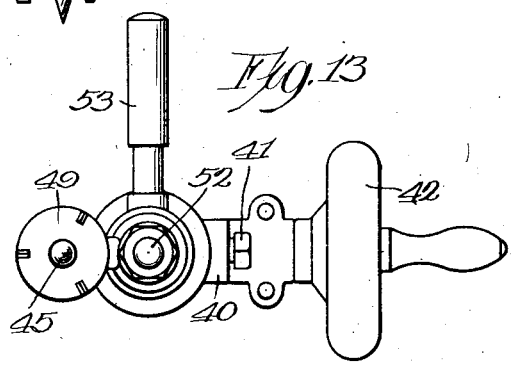
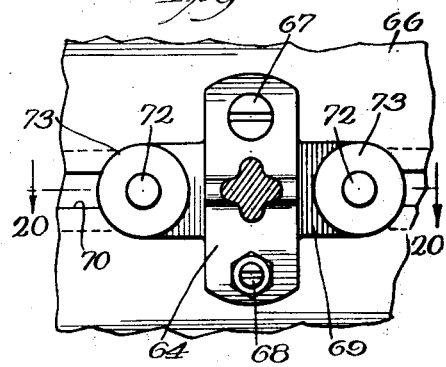
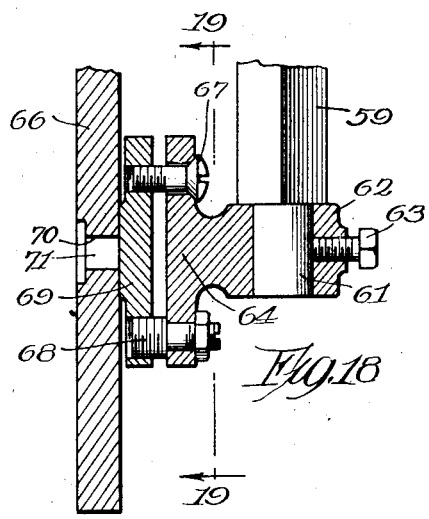
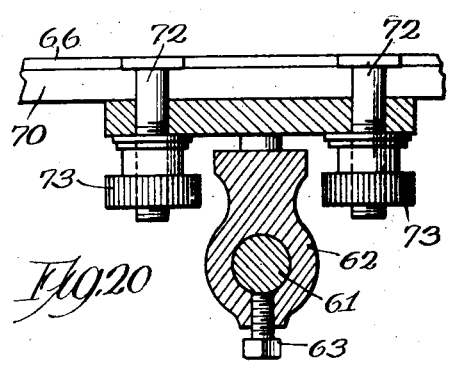
Inventors:
Edward M. Knabusch
Edwin Shoemaker
By Arthur H. Durand
Atty.

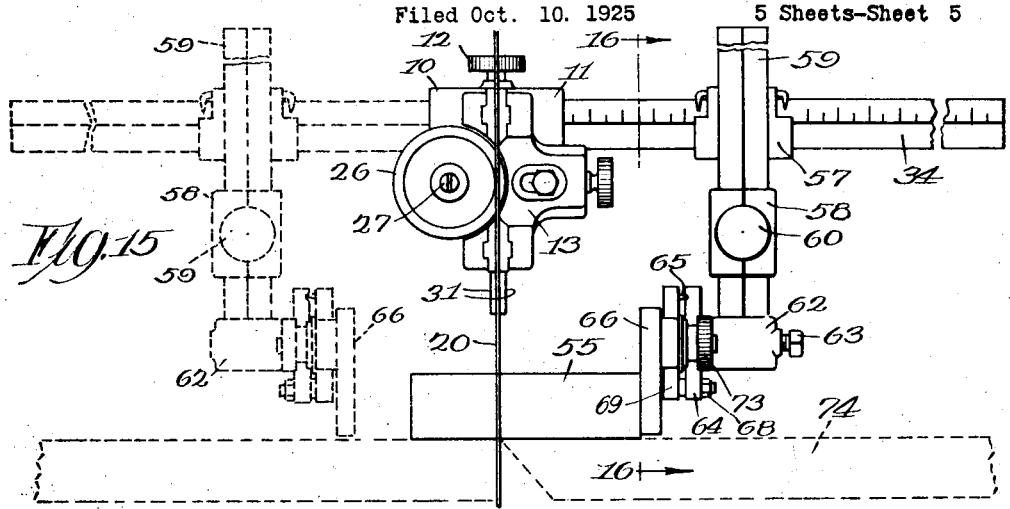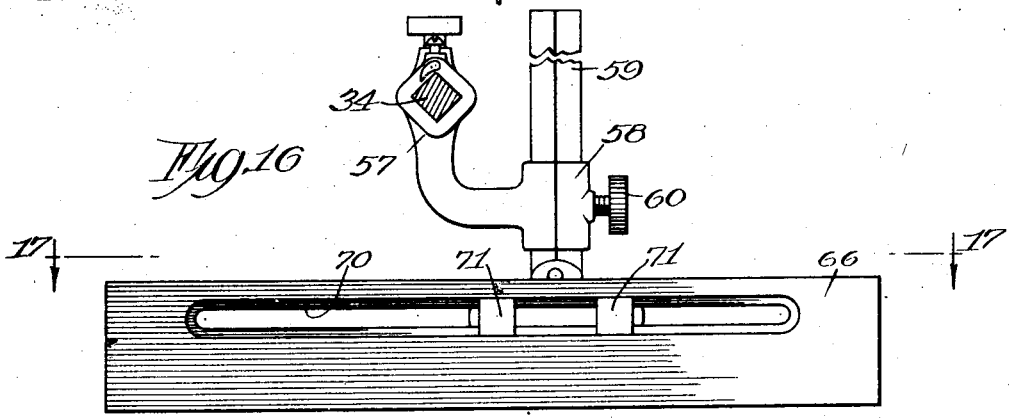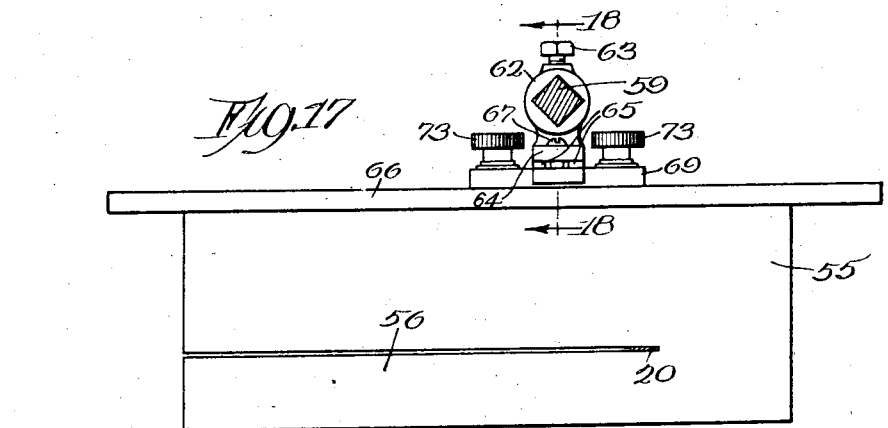

Patented Aug. 16, 1927.

1,639,039

UNITED STATES PATENT OFFICE.

EDWARD M. KNABUSCH, OF MONROE, AND EDWIN SHOEMAKER, OF CARLETON, MICHIGAN.

SAW GUIDE.

Application filed October 10, 1925. Serial No. 61,648.

This invention relates to saw guides, more particularly to guides for band saws, whereby the saw may be employed in different ways and for different purposes, in a satisfactory and efficient manner.

Generally stated, therefore, the object of the invention is to provide a novel and improved construction whereby the band saw may be efficiently guided, by guiding and controlling means of novel and improved construction, whereby to cut the lumber or the materials in the desired manner.

It is also an object to provide certain novel details and combinations and features of construction tending to increase the general efficiency and the desirability of saw guiding means and instrumentalities of this particular character.

To the foregoing and other useful ends, the invention consists in matters hereinafter set forth and claimed and shown in the accompanying drawings, in which:

Fig. 1 is a front elevation of a saw guiding arrangement embodying the principles of the invention.

Fig. 2 is a side elevation of the said device shown in Fig. 1.

Fig. 3 is a horizontal section on line 3—3, showing more or less diagrammatically the path taken by the band saw during its operation, and the edge of the pattern or guide for determining the form or character of the path to be followed by the saw.

Fig. 4 is a plan view of the structure shown in Figs. 1 and 2.

Fig. 5 is a side elevation of the structure shown in Fig. 1, and the structure shown in Fig. 2, but showing the other side thereof.

Fig. 6 is a detail horizontal section on line 6—6 in Fig. 5, looking down.

Fig. 7 is a detail view of one of the parts of said device.

Fig. 8 is a front elevation showing a different form of the invention.

Fig. 9 is an enlarged front elevation of certain portions of Fig. 8, with some portions shown in vertical section.

Fig. 10 is an enlarged transverse section on line 10—10 in Fig. 8.

Fig. 11 is a view looking down on the structure shown in Fig. 9.

Fig. 12 is a view similar to Fig. 9, showing the parts in a different position.

Fig. 13 is a view of the structure shown in Fig. 12 looking upward.

Fig. 14 is a diagrammatic view of the board or other piece of material cut by the apparatus shown in Figs. 8 to 13 inclusive.

Fig. 15 is a front elevation of another form of the invention.

Fig. 16 is a vertical section on line 16—16 in Fig. 15.

Fig. 17 is a horizontal section on line 17—17 in Fig. 16.

Fig. 18 is an enlarged vertical section on line 18—18 in Fig. 17.

Fig. 19 is a vertical section on line 19—19 in Fig. 18.

Fig. 20 is a horizontal section on line 20—20 in Fig. 19.

As shown in Figs. 1 to 8 inclusive, and in Fig. 15, the invention comprises a vertically disposed supporting member 1 of any suitable character, having its lower end removably clamped in a socket piece 2 by the set screw 3, said socket piece being rigid with the lateral extending bracket portions 4 having slots 5 therein. The adjustable block 6 is adapted to fit the undersides of the bracket portions 4, as shown, and bolts 7, carried by the block 6, extending upwardly through the slots 5, the tightening of these bolts serving to clamp the block 6 to the underside of the lateral bracket arms 4 in the manner shown. By means of the slots 5, the block 6 can be adjusted laterally. A cylindrical stem 8 is inserted horizontally through the block 6 and held in adjusted position therein by setscrew 9 in the manner shown. The stem 8 carries at its outer end a rigid body portion 10 having its upper portion provided with a rigid horizontally disposed rectangular socket portion 11 in which a horizontally disposed bar may be clamped by the setscrew 12, as will hereinafter more fully appear. The sliding member 13 has a slot 14 therein, and a screw stud 15 is inserted through this slot and into the body 10 as shown and an adjusting screw 16 has a rotatable or swivel connection 17 with the slot 18 of said member 13, and has threaded connection at 19 with the body 10, whereby adjustment of the screw will cause the member 13 to move toward and away from the vertically disposed band saw 20, which latter may be of any suitable character. This member 13 is provided with portions 21 which are secured to the bearing blocks 22 by screws 23, these blocks being adapted to engage one side of the band saw. Rigid portions 24 on the body 10 have similar bearing blocks 25 secured thereto, by similar screws, these blocks being adapted to bear against the other side of said band saw, but the band saw is not tightly embraced by these bearing portions 22 and 25, space between the bearing portions being provided to allow the band saw to run very freely. A backing for the rear edge of the band saw is provided by the wheel 26 carried by the adjustable stud 27 which latter is adjustably held in the body 10 by the setscrew 28 as shown. Antifriction balls 29 are interposed between the wheel 26 and its mounting, in any suitable or desired manner, to sustain the thrust, so that the pressure of the face of the wheel against the rear edge of the band saw will be sustained by the antifriction balls and the raceways therefor provided in the back of the wheel 6 and in the front face of the disc 30 which is rigid with the stud 27 previously mentioned. If desired, the screws 23 can extend through from the portions 21 to the portions 24, behind the rear edge of the saw. The bearing blocks 22 and 25 below are provided with extensions 31 which are preferably semicylindrical, as indicated in Fig. 3, thereby forming a foot between the two halves of which the saw travels, adapted to engage the edge of the pattern or guide 32, the latter being laid upon the board or other material 33 to be cut. With this arrangement, by moving the board 33 with the guide or pattern 31 thereon, the board or other material can be shifted in a manner to cause the saw to travel a predetermined path, as indicated in Fig. 3, thereby to cut the material in the desired manner. As previously explained, the pressure of the material against the cutting edge of the saw and the thrust of the saw edgewise rearwardly is sustained by the front or face of the wheel 26, near the periphery thereof, so that the wheel will be rotated on its antifriction bearing, the board 33 passing under the lower end of the feed or guiding device formed by the extensions 31 previously mentioned.

As shown in Fig. 8, the saw guiding device is substantially like that previously described, and is supported upon the square horizontally disposed bar 34 inserted in the horizontal socket piece 11 previously mentioned, the saw guide then being clamped in place by tightening the screw 12 previously mentioned. Auxiliary to the saw guide, a slide 35 is slidably mounted on the bar 34, and adapted to be held in place thereon by any suitable devices, such as the setscrew 36 or any other desired means. The slide 35 has a lower bifurcated portion 37, having horizontal slot 38 therein. A body 39 is provided and formed with a lateral portion 40 to slide in the slot 38, having a clamping screw head 41 for clamping the body 39 in any adjusted position in said slot.

The body 39 carries a horizontally disposed shaft provided at one end with a rotatable handwheel 42, and having at its other end a bevel pinion 43 for engagement with the bevel gear 44, which latter is slidable on the upper end portion of a square shaft 45 extending downwardly through the bearings 46 and 47 carried rigidly by the body member 39 previously mentioned. A grooved annular member 48 is fixed on the shaft 45 and the lower end of this shaft is provided with a chuck or gripper 49 for engaging the top of the board or other material to be cut. The body 39 has a cam member 50 rotatably mounted upon the vertically disposed lower portion 51 of said body, just above the stem 52 upon which the lower bearing 47 is rigidly held in a suitable manner, whereby this bearing 47 may be removed from the lower end of this stem. The cam 50 has a handle 53 rigid therewith, and a friction spring 54 suitably applied inside of said cam tends to hold it in any adjusted position. Therefore, by rotatably adjusting the cam 50, by means of its handle 53, the annular grooved member 48 may be raised or lowered the shaft 45 sliding up and down in the bearing 47 and in the gear 44, and being round below the member 48 but square above. In this way the chuck or gripping device 49 may be raised and lowered, and may be forced downwardly until its gripping face is impinged upon the top of the board, whereby the latter may be rotated at will by rotating the handwheel 42 previously mentioned. Therefore, with this arrangement, the board may be rotated about a vertical axis, which axis is coincident with the axis of the shaft 45, thereby to produce a circular cut in the manner shown in Fig. 14 of the drawings.

As shown in Figs. 15, 16, 17, 18, 19 and 20, the board 55 is slidable in a straight direction to produce a straight cut 56 therein, by the use of means, as follows: Again the square bar 34, previously described, is inserted in the horizontal socket piece 11 of the saw guide, and this bar carries a slide 57 suitably mounted thereon, said slide having its lower portion provided with a vertically disposed socket piece 58 in which a vertically disposed square stem 59 may be adjustably held by the setscrew 60 in a manner that will be readily understood. The lower end portion 61 of the stem 59 may be cylindrical and adjustably held in a socket piece 62 by setscrew 63 in the manner shown. This socket piece 62 is preferably provided in its inner side with a plate 64 having knife edges 65 on the face thereof, and an opposing plate 66 is disposed in position to rock on said edges, being held thereto by adjustable screw 67 inserted through the two plates. The lower portions of the plates are connected by adjusting screws 68 in the manner shown, so that by adjustment of these screws the plate 69, to which latter the larger plate 66 is slidably secured, so that the shorter plate 69 forms the inner face of the plate 66, may be adjusted to the desired angle about a horizontal axis coincident with the edges of the knife-edge portions 65 previously mentioned. The plate 68 is provided with a slot 70 in which the portions 71, which may be the heads of screw bolts 72, may slide back and forth, thereby to permit horizontal and endwise adjustment of the plate 66 at will, on the plate 69, in a manner that can be readily understood. The thumb nuts 73 on the bolts 72 provide the means for clamping the plate 69 against the plate 66, so that the latter may be held in its adjusted position. Thus the plate 66 provides a guide for one edge of the board 55, so that the latter may slide endwise and be cut or divided as shown, the board being pushed by hand for this purpose. By adjusting the socket piece 62 about the vertical axis provided by the cylindrical end portion 61, the guide 66 may assume any angle, and the guide can also be raised and lowered by raising and lowering the stem 59 in the socket piece 58 previously described. Again, the slide 57 can be moved laterally on the bar 34, thereby to vary the distance between the saw 20 and the guide 66, in accordance with the character of the work to be done.

It will be understood, of course, that in all of the different forms of the invention the saw table 74 is employed to support the board to be sawed. In Fig. 8, the dotted lines to the left represent the position to be assumed by the device for rotating the board, when conditions so require. In Fig. 15, the dotted lines to the left indicate the position to be assumed by the guide 66 for the board, when conditions so require. Thus the saw guide, by means of the horizontal socket piece 11, is adapted to support a bar 34 upon which an auxiliary device may be employed for rotating the board, or for guiding the board when this method is desired. As shown in Fig. 1, however, the saw guide may be lowered or disposed in a position to engage a pattern or guide member 32 fastened temporarily to the board, so that no auxiliary guiding or other devices are necessary. Thus the saw guide in itself is formed and constructed to permit different methods of use thereof, depending upon the character of the work.

In every case, it will be seen that the saw guide is rotatably supported by the socket piece 2 in which the reduced lower end of the support 1 is held, by the setscrew 3, as shown more clearly in Fig. 5, so that the socket piece may be rotated about a vertically disposed axis, and held in such adjusted position, thereby to adjust the saw guide itself about a vertically disposed axis. Also, in each case, by reason of the cylindrical stem 8, the saw guide is adjustable about a horizontally disposed axis, and may be retained in such adjusted position by the setscrew 9 in the manner explained.

Without disclaiming anything, and without prejudice to any novelty disclosed, what we claim as our invention is:

1. A saw guide having means of support therefore adjacent to a band saw, and adjacent to auxiliary devices for controlling the work, having structural provisions to support and permit adjustment of said devices bodily toward and away from the guide, serving to maintain said guide and said devices in fixed parallel relation when viewed from above, and having instrumentalities for engaging the sides and rear edge of the saw to hold the saw in position to perform the required work.

2. A saw guide as specified in claim 1, said instrumentalities comprising a depending portion engaging the side of the saw and adapted to also engage a guide disposed on the board or material to be sawed, so that movement of the board or material will produce a cut therein of the desired character.

3. A saw guide as specified in claim 1, said instrumentalities comprising adjustable jaws embracing the sides of the saw and adjustable toward and away from each other to provide clearance for the saw between them.

4. A saw guide as specified in claim 1, said instrumentalities comprising a wheel having its face disposed in position to engage the rear edge of the saw, near the periphery of the wheel, to take the thrust of the saw, and rotatable by the motion of the saw.

5. A saw guide as specified in claim 1, said instrumentalities comprising a wheel having its face disposed in position to engage the rear edge of the saw, near the periphery of the wheel, to take the thrust of the saw, and rotatable by the motion of the saw, said wheel having a thrust bearing with anti-friction means in rear thereof to sustain the thrust of the saw.

6. A saw guide as specified in claim 1, having a horizontal stem both endwise adjustable and rotatable about a horizontally disposed axis to properly position the saw guide relatively to the saw, and said means of support comprising a laterally adjustable support for said stem.

7. A saw guide as specified in claim 1, having means whereby the guide is laterally movable bodily and thereby adjustable on its supporting means.

8. A saw guide as specified in claim 1, having provisions whereby the guide is adjustable about a vertically disposed axis.

9. A structure as specified in claim 1, said saw guide having means to engage a horizontally disposed bar, when necessary or desirable, and auxiliary means on said bar, adjustable thereon, to engage the board or material to be cut, thereby to control the cutting action.

10. A structure as specified in claim 1, said saw guide structural provisions comprising means to engage a horizontally disposed bar, when necessary or desirable, and said auxiliary devices being on said bar, and adjustable longitudinally thereon, to engage the board or material to be cut, thereby to control the cutting action, said auxiliary devices having devices for engaging and rotating the board or material to be cut.

11. A structure as specified in claim 1, said saw guide structural provisions comprising means to engage a horizontally disposed bar, when necessary or desirable, and said auxiliary devices being on said bar, and adjustable longitudinally thereon, to engage the board or material to be cut, thereby to control the cutting action, said auxiliary devices being adjustable to engage the board or material to be cut in a manner to properly control the cutting action.

12. A saw guide as specified in claim 1, having a horizontally disposed socket piece adapted to engage a horizontally disposed bar, forming said provisions, so that the bar may be adjusted endwise on the guide, and said auxiliary means being adjustable longitudinally of the said bar, in either a right or left position thereon, to engage or control the board or material to be cut.

13. A saw guide as specified in claim 1, having means for engaging a horizontally disposed bar, forming said provisions, with said auxiliary devices slidably supported on said bar, forming a controller for the board or material to be cut.

14. A saw guide having means of support therefor adjacent to a band saw, and having instrumentalities for engaging the sides and rear edge of the saw to hold the saw in position to perform the required work, said saw guide having means to engage a horizontally disposed bar, when necessary or desirable, and auxiliary means on said bar, adjustable thereon, to engage the board or material to be cut, thereby to control the cutting action, said auxiliary means having devices for engaging and rotating the board or material to be cut.

Specification signed this 6th day of October, 1925.

EDWARD M. KNABUSCH.
EDWIN SHOEMAKER.